(12) United States Patent
McCorkendale et al.

(10) Patent No.: US 8,281,366 B1
(45) Date of Patent: Oct. 2, 2012

(54) SYSTEMS AND METHODS FOR USING GUARDIAN PROXIMITY TO CONTROL COMPUTING ACTIVITIES OF CHILDREN

(75) Inventors: Bruce McCorkendale, Manhattan Beach, CA (US); Shaun Cooley, El Segundo, CA (US)

(73) Assignee: Symantec Corporation, Mountain View, CA (US)

( * ) Notice: Subject to any disclaimer, the term of this patent is extended or adjusted under 35 U.S.C. 154(b) by 428 days.

(21) Appl. No.: 12/579,093

(22) Filed: Oct. 14, 2009

(51) Int. Cl.
*H04L 9/32* (2006.01)
(52) U.S. Cl. .......................... 726/2; 726/3; 726/7; 726/9
(58) Field of Classification Search ................. 726/2–7, 726/9, 16–21; 713/182–186
See application file for complete search history.

(56) References Cited

U.S. PATENT DOCUMENTS 6,570,610 B1 * 5/2003 Kipust .......................... 348/156

OTHER PUBLICATIONS

Aladdin; eToken PRO Anywhere—Secure Access to Your Digital Identity and Information; http://www.aladdin.com/etoken/devices/pro-anywhere.aspx; Taken from site on Oct. 7, 2009.

* cited by examiner

*Primary Examiner* — Hosuk Song
(74) *Attorney, Agent, or Firm* — Advantedge Law Group

(57) ABSTRACT

A computer-implemented method for using guardian proximity to control computing activities of children. The method may include determining that a child is attempting to access a computing system and determining whether a guardian of the child is in proximity of the computing system. The method may also include limiting the child's access to one or more resources of the computing system if the guardian of the child is not in proximity of the computing system and permitting the child to access the one or more resources of the computing system if the guardian of the child is in proximity of the computing system.

16 Claims, 7 Drawing Sheets

SYSTEMS AND METHODS FOR USING GUARDIAN PROXIMITY TO CONTROL COMPUTING ACTIVITIES OF CHILDREN

BACKGROUND

Children increasingly use computers in their everyday activities and may access a variety of content through computers. A parent or an organization may deem some content inappropriate for a child and may wish to prevent that child from accessing such content.

If a parent deems computer-accessible content inappropriate, the parent may use parental-control software to block a child from accessing the content's source (e.g., a computer application or a website). However, it may be difficult or time-intensive for a parent to ascertain whether a particular source should be blocked. The ever-growing number of available sources of content may multiply this burden, which may make the parent's task of managing parental control software unduly difficult.

Parental-control software vendors may make content gatekeeping quicker and easier for parents by allowing them to automatically block content sources that the vendors determine are inappropriate. A parental-control-software vendor may use various methods to flag inappropriate content. For example, a parental-control software vendor may provide blacklists to which parents may subscribe. However, a blacklist may result in too many false negatives and false positives. For example, a blacklist may include a content source with valuable content that many parents would want open to their children. The same blacklist may fail to cover certain content sources that many parents would want to block.

In addition to or instead of blacklists, parental-control software may use heuristics (e.g., keyword detection) to guess whether content is inappropriate for a child. However, this method may suffer from the same fundamental defects as blacklists: too many false negatives and false positives. For example, a keyword that usually signals inappropriate content may be benign in some contexts, and some inappropriate content may contain no signaling keywords.

SUMMARY

As will be described in greater detail below, the instant disclosure generally relates to systems and methods for using guardian proximity to control computing activities of children. Embodiments of the instant disclosure may determine whether to permit a child to access a computer resource based on whether a parent is in proximity of a computing device used by the child. For example, a method may include determining that a child is attempting to access a computing system (e.g., log onto or use a resource of the computing system) and determining whether a guardian of the child is in proximity of the computing system. If the guardian of the child is not in proximity of the computing system, a parental-control module may limit the child's access to one or more resources (e.g., the Internet, a game, digital media, etc.) of the computing system. If the guardian of the child is in proximity of the computing system, the parental-control module may permit the child to access the one or more resources of the computing system to which access is restricted when the guardian is not in proximity of the computing system.

In some embodiments, the parental-control module may base a child's ability to access a computing resource on whether a parental-control key (e.g., a USB dongle) is connected to the computing system. For example, if the parental-control key is connected to the computing system and the guardian is in proximity of the computing system, the child may be permitted to access one or more restricted resources of the computing system. In some embodiments, the parental-control key may include a proximity sensor that detects whether the guardian is in proximity of the computing system. Alternatively, the parental-control key may be distinct from a sensor or other proximity detection technology that detects proximity of a guardian.

As noted, determining whether the guardian of the child is in proximity of the computing system may include using a proximity sensor to detect the presence of a proximity device carried by the guardian. For example, a Bluetooth network of the computing system may detect the presence of a Bluetooth device (e.g., a cellular telephone) carried by the guardian. Additionally or alternatively, the computing system may use the proximity sensor to detect the presence of an electronic key fob carried by the guardian. In some embodiments, the proximity sensor may include a Radio Frequency Identification ("RFID") reader. In various embodiments, the electronic key fob carried by the guardian may include an automobile key. The proximity device carried by the guardian may additionally or alternatively include a badge carried by the guardian, a card carried by the guardian, and/or a piece of jewelry worn by the guardian.

According to certain embodiments, determining whether a guardian of the child is in proximity of the computing system may include using face-recognition technology to identify the guardian and/or using speaker-recognition technology to identify the guardian. Additionally or alternatively, determining whether a guardian of the child is in proximity of the computing device may include using a global-positioning-system device to determine a location of the guardian of the child.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
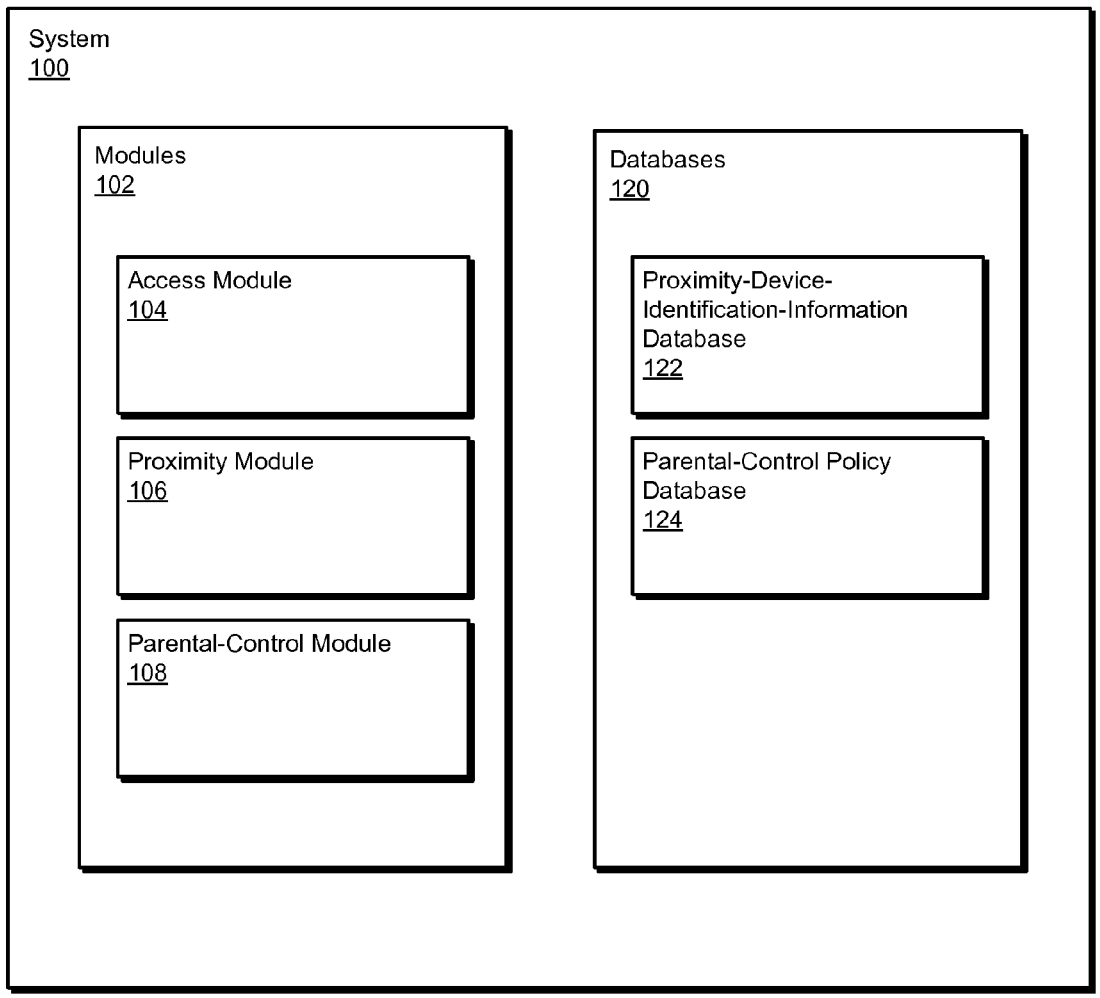
FIG. 1 is a block diagram of an exemplary system for using guardian proximity to control computing activities of children.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

As will be described in greater detail below, the instant disclosure generally relates to systems and methods for using guardian proximity to control computing activities of children. Embodiments of the instant disclosure may provide effective oversight and control over a child's computing session through proximity detection of a guardian. For example a child may be unable to access the Internet or other computing resources unless a guardian is in proximity of the child's computing system. In other words, a child may only be able to access the Internet or other computing resources when a guardian has expressly allowed access and is within a reasonable proximity of the child. Such parental control may be effective because a child may be unable to engage in certain computing activities unless a guardian is present, which means that the guardian will be able to monitor the child and the child may be more careful with computing activities knowing that a guardian is watching. As used herein the term "guardian" is used interchangeably with the term "parent" to refer to any individual who is responsible for supervising a child's use of a computing system.

Figure 2:
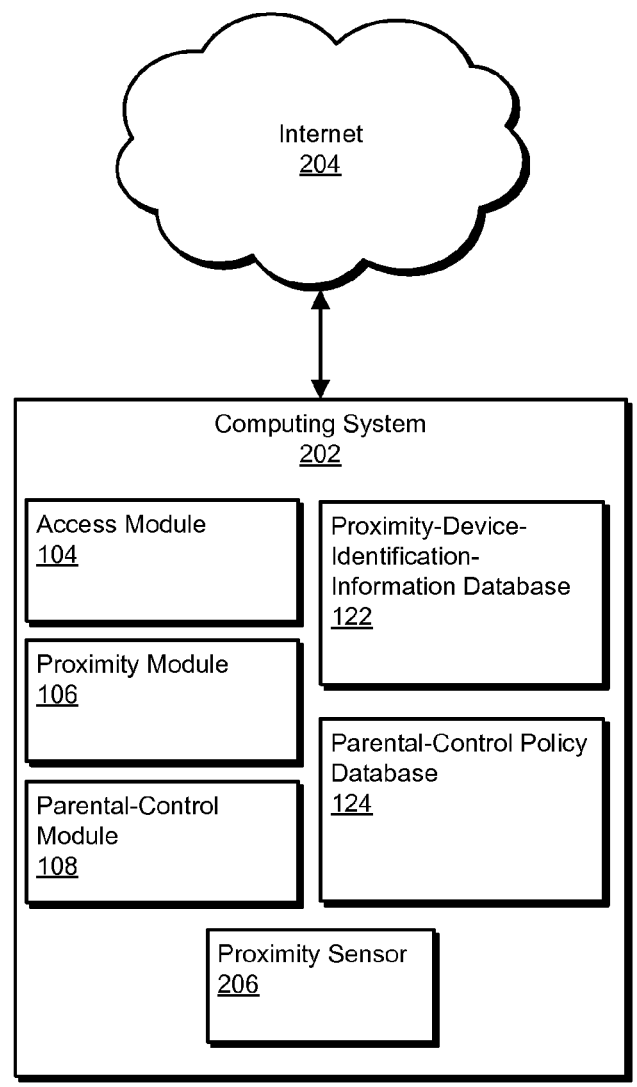
FIG. 2 is a block diagram of another exemplary system for using guardian proximity to control computing activities of children.
Figure 3:
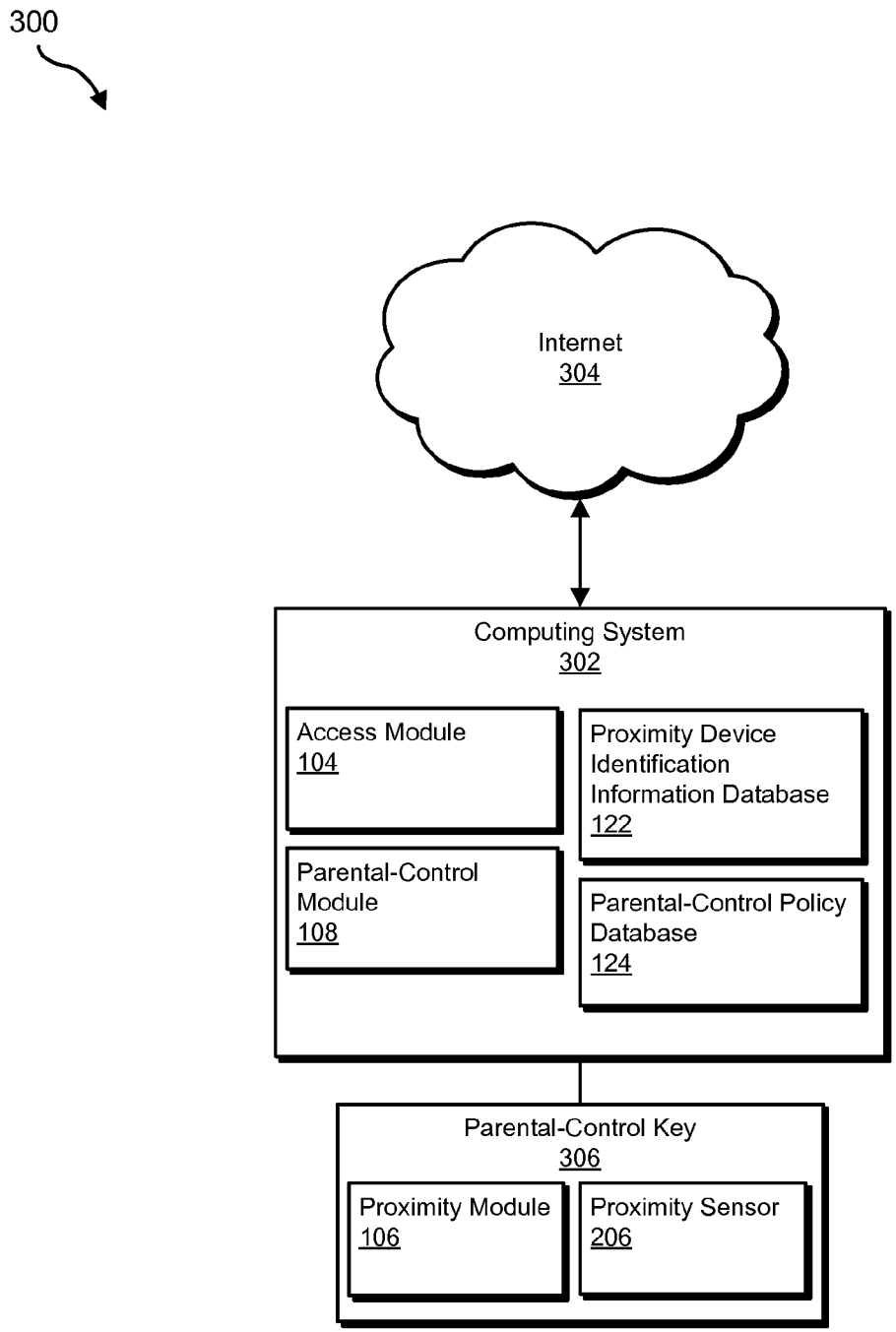
FIG. 3 is a block diagram of another exemplary system for using guardian proximity to control computing activities of children.

The following will provide, with reference to FIGS. 1-3, detailed descriptions of exemplary systems for using guardian proximity to control computing activities of children. Detailed descriptions of corresponding computer-implemented methods will also be provided in connection with FIGS. 4 and 5. In addition, detailed descriptions of an exemplary computing system and network architecture capable of implementing one or more of the embodiments described herein will be provided in connection with FIGS. 6 and 7, respectively.

FIG. 1 is a block diagram of an exemplary system 100 for using guardian proximity to control computing activities of children. As illustrated in this figure, exemplary system 100 may include one or more modules 102 for performing one or more tasks. For example, and as will be explained in greater detail below, exemplary system 100 may include an access module 104 programmed to determine that a child is attempting to access a computing system. Exemplary system 100 may also include a proximity module 106 programmed to determine whether a guardian of the child is in proximity of the computing system.

In addition, and as will be described in greater detail below, exemplary system 100 may include a parental-control module 108 programmed to limit the child's access to one or more resources of the computing system if the guardian of the child is not in proximity of the computing system and programmed to permit the child to access the one or more resources of the computing system if the guardian of the child is in proximity of the computing system. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, as will be described in greater detail below, one or more of modules 102 may represent software modules stored and configured to run on one or more computing devices, such as computing system 202 in FIG. 2, computing system 302 in FIG. 3, computing system 610 in FIG. 6, and/or portions of exemplary network architecture 700 in FIG. 7. One or more of modules 102 in FIG. 1 may also represent all or portions of one or more special-purpose computers configured to perform one or more tasks.

As illustrated in FIG. 1, exemplary system 100 may also include one or more databases 120. Databases 120 may represent portions of a single database or computing device or a plurality of databases or computing devices. In one embodiment, exemplary system 100 may include a proximity-device-identification-information database 122 for storing identification information for one or more proximity devices. System 100 may also include a parental-control policy database 124 for storing one or more parental control policies. The phrase "parental-control policies," as used herein, generally refers to policies and/or settings that control access to computing information and/or resources. Parental-control policies may include policies that restrict, limit, prohibit, or otherwise control activities of children. For example, parental-control policies may define conditions and limitations on a child's use of particular computer resources. As another example, parental-control policies may include policies that limit access to various types of objectionable content and/or content that may be inappropriate for children of a particular age. In some embodiments, a parental-control policy may set forth approved or prohibited websites. A parental-control policy may also set forth file permissions for a child and/or may define access control for other computer resources. A more restrictive set of parental-control policies may be applied when a guardian is not present to monitor a child's computing activities, and a more permissive set of parental-control policies may be applied when a guardian is present.

Databases 120 in FIG. 1 may represent a portion of one or more computing devices. For example, databases 120 may represent a portion of computing system 202 in FIG. 2, computing system 302 in FIG. 3, computing system 610 in FIG. 6, and/or portions of exemplary network architecture 700 in FIG. 7. Alternatively, databases 120 in FIG. 1 may represent one or more physically separate devices capable of being accessed by a computing device, such as computing system 202 in FIG. 2, computing system 302 in FIG. 3, computing system 610 in FIG. 6 and/or portions of exemplary network architecture 700 in FIG. 7.

Exemplary system 100 in FIG. 1 may be deployed in a variety of ways. For example, all or a portion of exemplary system 100 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

As shown in FIG. 2, system 200 may include a computing system 202 in communication with the Internet 204. Computing system 202 generally represents any type or form of computing device capable of reading computer-executable instructions. Examples of computing system 202 include, without limitation, laptops, desktops, servers, cellular phones, personal digital assistants (PDAs), multimedia players, embedded systems, combinations of one or more of the same, exemplary computing system 610 in FIG. 6, or any other suitable computing device.

Computing system 202, which may be a computer used by a child, may include access module 104, proximity module 106, parental-control module 108, proximity-device-identification-database 122, and parental-control policy database 124. While FIG. 2 shows modules 104-108 and databases 122-124 on a single computing system, the functionality of one or more of databases 104-108 and/or the data of one or more of databases 122-124 may be located on a computing system remote from computing system 202 (e.g., in a cloud-computing environment).

Computing system 202 may include a proximity sensor 206. Proximity sensor 206 may detect the presence of a device carried by a guardian, which may enable proximity module 106 to determine whether a guardian is in proximity of computing system 202. Proximity sensor 206 may be a Bluetooth network device, an infrared device, an RFID device, a web cam, a microphone, and/or any other device capable of detecting the proximity of a guardian.

FIG. 3 illustrates system 300, which is an alternative configuration to FIG. 2. As shown in FIG. 3, computing system 302 may connect to internet 304 and may include access module 104, parental-control module 108, proximity-device-identification-information database 122, and parental-control policy database 124. A parental-control key 306 may be connected to computing system 302. Parental-control key 306 may include proximity module 106 and proximity sensor 206. Parental-control key 306 may be a USB dongle or other device that a child plugs into computing system 302 when the child wants to use one or more resources of computing system 302. Parental-control keys are discussed in greater detail in FIG. 5.

As an example of how a child may use parental-control key 306, the child may plug parental-control key 306 into computing system 302 when the child wants to use the internet. Parental-control key 306 may determine whether a guardian is in proximity of computing system 302 before allowing the child to access the internet.

Embodiments of the instant disclosure may be implemented with a parental-control key (as shown in FIG. 2) or without a parental-control key (as shown in FIG. 3). In embodiments that use a parental-control key, the parental-control key may include a proximity sensor (as shown in FIG. 3) and/or the child's computing system may include the proximity sensor or other proximity detection technology.

Figure 4:
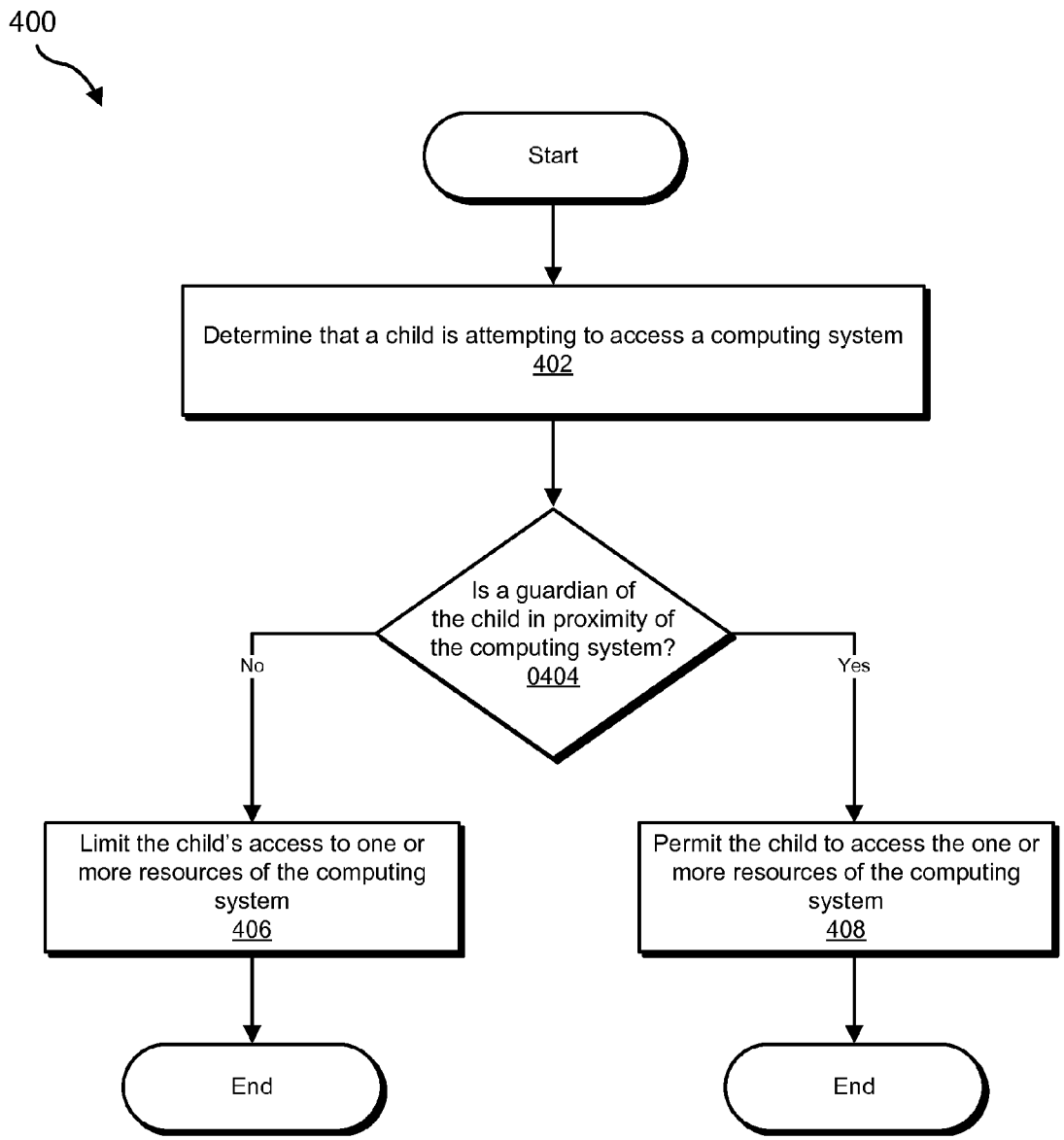
FIG. 4 is a flow diagram of an exemplary method for using guardian proximity to control computing activities of children.

FIG. 4 is a flow diagram of an exemplary computer-implemented method 400 for using guardian proximity to control computing activities of children. The steps shown in FIG. 4 may be performed by any suitable computer-executable code and/or computing system. In some embodiments, the steps shown in FIG. 4 may be performed by one or more of the components of system 100 in FIG. 1. At step 402 in FIG. 4, one or more of the systems described herein may determine that a child is attempting to access a computing system. For example, access module 104 in FIG. 2 may determine that a child is attempting to access computing system 202.

Access module 104 may determine that a child is attempting to access a computing system in a variety of contexts. For example, access module 104 may determine that a child is attempting to access a computing system by determining that the child is attempting to log on to the computing system. In such embodiments, access module 104 may receive credentials and/or other information identifying the child as the child attempts to log on to the computing system. In other embodiments, access module 104 may determine that a child is attempting to access the computing system by determining that the child is attempting to access a resource of the computing system. For example, access module 104 may determine that the child is attempting to access the Internet on computing system 202. In such embodiments, access module 104 may first determine that the user on the computing system is the child and then may determine that the child is attempting to access the Internet.

Access module 104 may determine that a user on the computing system is the child by using any suitable identification technology. For example, access module 104 may use log on credentials for the computing system and/or any other identification information to identify the child. Alternatively, access module 104 may identify the child through voice-recognition technology, face-recognition technology, and/or any other suitable recognition means. In some embodiments, access module 104 may identify the child by determining that a parental-control key associated with the child is connected to the computing system.

At decision 404 in FIG. 4, one or more of the systems described herein may determine whether a guardian of the child is in proximity of the computing system. For example, proximity module 106 may determine whether a guardian of the child is in proximity of the computing system. In some embodiments, proximity module 106 may interact with a proximity sensor, such as proximity sensor 206 in FIG. 3, to detect the presence of a proximity device carried by the guardian. For example, the computing system may use a Bluetooth network to detect the presence of a Bluetooth device carried by the guardian. Examples of such Bluetooth devices include cellular telephones, Bluetooth headsets, MP3 players, and/or other mobile Bluetooth devices.

Additionally or alternatively, the proximity sensor may include a Radio-Frequency-Identification ("RFID") reader. The RFID reader may be implemented using any suitable RFID technology. In some embodiments, the proximity sensor may detect the presence of an electronic key fob carried by the guardian. The electronic key fob carried by the guardian may be an automobile key and/or any other type of electronic key fob. In some embodiments, the proximity device carried by the guardian may include a badge carried by the guardian, a card carried by the guardian, a piece of jewelry worn by the guardian, and/or any other electronic device carried by the guardian and capable of being detected by a proximity sensor. For example, a proximity device may be embedded in a watch or other piece of jewelry worn by the guardian.

According to certain embodiments, determining whether a guardian of the child is in proximity of the computing device may include using face-recognition technology to identify the guardian, using speaker-recognition technology to identify the guardian, and/or using a global-positioning-system technology (or other hybrid positioning system technologies, such as cell tower triangulation or wi-fi positioning), to determine a location of the guardian. For example, if the guardian carries a phone that is GPS enabled, proximity module 106 may determine that the guardian is in proximity of the computing system when the cell phone is determined to be within a predetermined range of the computing system.

Proximity module 106 may determine whether the guardian is in proximity of the computing system based on a variety of parameters. For example, proximity module 106 may determine that the guardian may be within a predetermined range of the computing system (e.g., within 10 feet of the computing system). Alternatively, proximity module 106 may determine that the guardian is in proximity of the computing system if the guardian is in line of sight of the computing system (e.g., using infrared technologies). In other embodiments, proximity module 106 may determine that the guardian is in proximity of the computing system by determining that the guardian is in the same room as the computing system (e.g., the guardian may define boundaries of the room using GPS coordinates). Additionally or alternatively, proximity module 106 may determine that the guardian is in proximity of the computing system by determining whether the guardian is within range of a proximity sensor (e.g., whether a Bluetooth device is in range of a Bluetooth network of the computing system).

A user (e.g., the guardian or any other administrator) may configure the range or area that determines whether the guardian is in proximity of the computing system. For example, the guardian may set the proximity range as a 15 foot radius around the computing system. The guardian may also establish any other proximity range or area. In other embodiments, proximity module 106 may implement a default range for determining whether the guardian is in proximity of the computing system.

If the guardian of the child is not in proximity of the computing system, parental-control module 108 may enforce a parental-control policy by limiting the child's access to one or more resources of the computing system (step 406). For example, parental-control module 108 may enforce a policy that indicates that the child is not permitted to access the Internet unless the guardian of the child is in proximity of the computing system. In such situations, parental-control module 108 may prohibit the child from accessing the Internet when the guardian is not present.

If the guardian of the child is in proximity of the computing system, parental-control module 108 may permit the child to access resources that are restricted when the guardian is not in proximity of the computing system (step 408). For example, parental-control module 108 may permit the child to access the Internet when the guardian of the child is in proximity of the computing system. Parental-control module 108 may control access to one or more of various resources on a computing system, such as computing system 202 and/or 302. For example, parental-control module 108 may control access to the Internet, an instant messaging program, an e-mail program, a social-networking website, one or more video games, and/or various types of digital media (e.g., images, video, movies, music, etc.).

Figure 5:
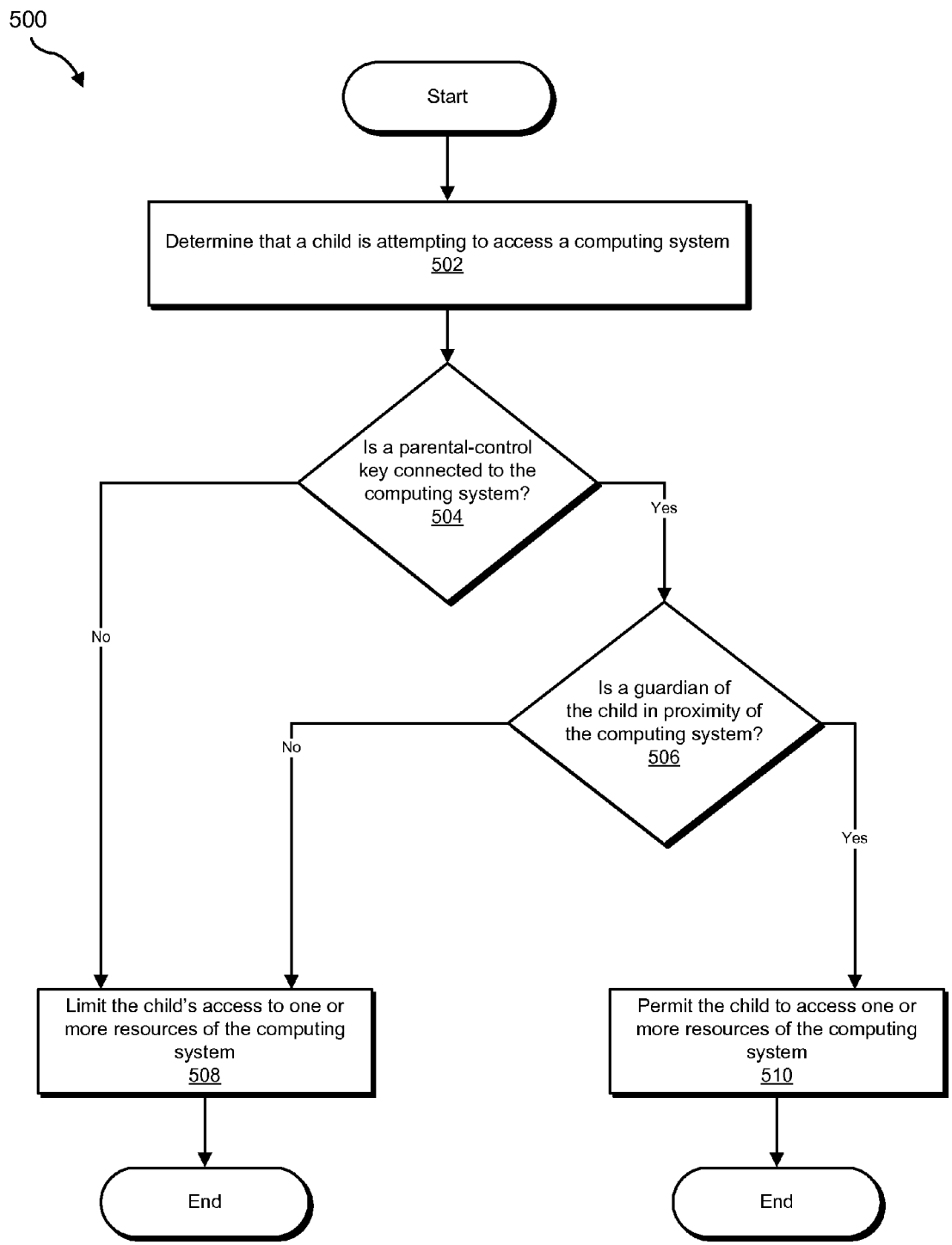
FIG. 5 is a flow diagram of another exemplary method for using guardian proximity to control computing activities of children.

FIG. 5 is a flow diagram of an exemplary computer-implemented method 500 for using guardian proximity and parental-control keys to control computing activities of children. The steps shown in FIG. 5 may be performed by any suitable computer executable code and/or computing system. In some embodiments, the steps shown in FIG. 5 may be performed by one or more of the components of system 300 in FIG. 3.

At step 502 in FIG. 5, one or more of the systems described herein may determine that a child is attempting to access a computing system. For example, access module 104 in computing system 302 may determine that a child is attempting to access computing system 302. Step 502 in FIG. 5 is comparable to step 402 in FIG. 4—therefore, the discussion of step 402 in FIG. 4 applies to step 502 in FIG. 5.

At decision 504, one or more of the systems described herein may determine whether a parental-control key is connected to the computing system. For example, access module 104 may determine whether parental-control key 306 is connected to computing system 302. If parental-control key 306 is not connected to computing system 302, parental-control module 108 may limit the child's access to one or more resources of the computing system (step 508).

As used herein, the phrase "parental-control key" generally refers to any type of hardware device that a child may need to connect to a computing system to allow the child to access one or more resources of the computing system. For example, the parental-control key may be a USB dongle that the child carries and connects to the computer when the child desires to access one or more resources of the computer. Access module 104 may identify the USB dongle using a serial number of the USB dongle or other identification information of the USB dongle.

In some embodiments, when a parental-control key is first inserted into a computing system, the parental-control key may set up a control service that only allows access to a resource of the computing system when the parental-control key is connected to the computing system. Thus, when the parental-control key is connected to the computing system at a later point in time, the control service may identify the parental-control key and allow access to the computing resource.

In addition to checking whether a parental-control key is connected to the computing system, access module 104 may determine whether a guardian of the child is in proximity of the computing system at decision 506. While decision 504 is shown before decision 506 in FIG. 5, decision 506 may be performed before or simultaneously with decision 504.

If the parental-control key is connected to the computing system and the guardian of the child is in proximity of the computing system, the child may be permitted to access one or more resources of the computing system (step 510). If the parental-control key is connected to the computing system and a guardian of the child is not in proximity of the computing system, parental-control module 108 may limit the child's access to one or more resources of the computing system (step 508).

As shown in FIG. 3, the parental-control key may include proximity sensor 206 that detects the presence of a guardian. Alternatively, the parental-control key and the proximity sensor may be distinct hardware devices. For example, the parental-control key may be a USB dongle and the proximity sensor may be existing hardware of a computing system or a separate external hardware device connected to the computing system.

Figure 6:
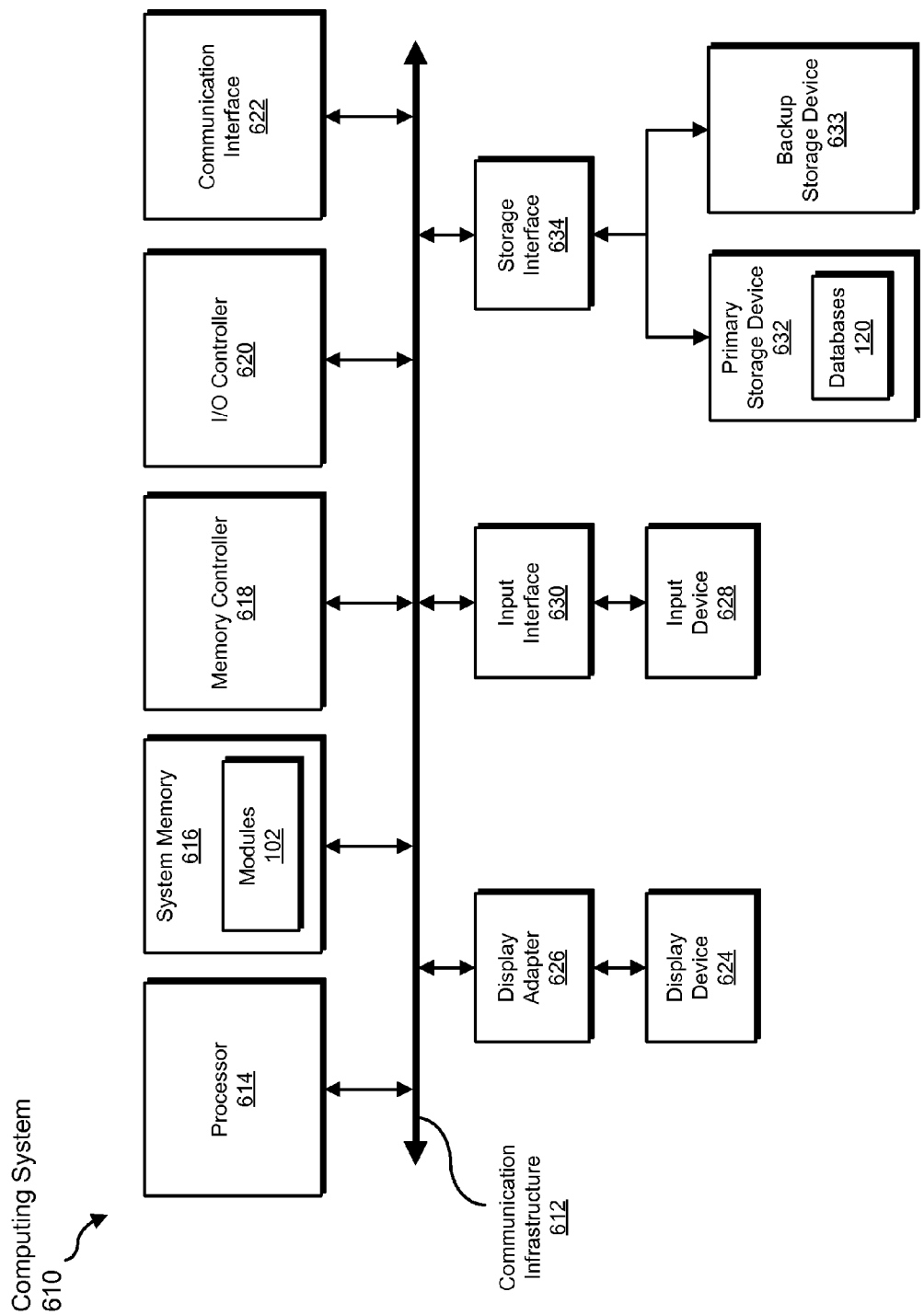
FIG. 6 is a block diagram of an exemplary computing system capable of implementing one or more of the embodiments described and/or illustrated herein.

FIG. 6 is a block diagram of an exemplary computing system 610 capable of implementing one or more of the embodiments described and/or illustrated herein. Computing system 610 broadly represents any single or multi-processor computing device or system capable of executing computer-readable instructions. Examples of computing system 610 include, without limitation, workstations, laptops, client-side terminals, servers, distributed computing systems, handheld devices, or any other computing system or device. In its most basic configuration, computing system 610 may include at least one processor 614 and a system memory 616.

Processor 614 generally represents any type or form of processing unit capable of processing data or interpreting and executing instructions. In certain embodiments, processor 614 may receive instructions from a software application or module. These instructions may cause processor 614 to perform the functions of one or more of the exemplary embodiments described and/or illustrated herein. For example, processor 614 may perform and/or be a means for performing, either alone or in combination with other elements, one or more of the determining, limiting, permitting, and using steps described herein. Processor 614 may also perform and/or be a means for performing any other steps, methods, or processes described and/or illustrated herein.

System memory 616 generally represents any type or form of volatile or non-volatile storage device or medium capable of storing data and/or other computer-readable instructions. Examples of system memory 616 include, without limitation, random access memory (RAM), read only memory (ROM), flash memory, or any other suitable memory device. Although not required, in certain embodiments computing system 610 may include both a volatile memory unit (such as, for example, system memory 616) and a non-volatile storage device (such as, for example, primary storage device 632, as described in detail below). In one example, one or more of modules 102 from FIG. 1 may be loaded into system memory 616.

In certain embodiments, exemplary computing system 610 may also include one or more components or elements in addition to processor 614 and system memory 616. For example, as illustrated in FIG. 6, computing system 610 may include a memory controller 618, an Input/Output (I/O) controller 620, and a communication interface 622, each of which may be interconnected via a communication infrastructure 612. Communication infrastructure 612 generally represents any type or form of infrastructure capable of facilitating communication between one or more components of a computing device. Examples of communication infrastructure 612 include, without limitation, a communication bus (such as an ISA, PCI, PCIe, or similar bus) and a network.

Memory controller 618 generally represents any type or form of device capable of handling memory or data or controlling communication between one or more components of computing system 610. For example, in certain embodiments memory controller 618 may control communication between processor 614, system memory 616, and I/O controller 620 via communication infrastructure 612. In certain embodiments, memory controller may perform and/or be a means for performing, either alone or in combination with other elements, one or more of the steps or features described and/or illustrated herein, such as determining, limiting, permitting, and using.

I/O controller 620 generally represents any type or form of module capable of coordinating and/or controlling the input and output functions of a computing device. For example, in certain embodiments I/O controller 620 may control or facilitate transfer of data between one or more elements of computing system 610, such as processor 614, system memory 616, communication interface 622, display adapter 626, input interface 630, and storage interface 634. I/O controller 620 may be used, for example, to perform and/or be a means for performing, either alone or in combination with other elements, one or more of the determining, limiting, permitting, and using steps described herein. I/O controller 620 may also be used to perform and/or be a means for performing other steps and features set forth in the instant disclosure.

Communication interface 622 broadly represents any type or form of communication device or adapter capable of facilitating communication between exemplary computing system 610 and one or more additional devices. For example, in certain embodiments communication interface 622 may facilitate communication between computing system 610 and a private or public network including additional computing systems. Examples of communication interface 622 include, without limitation, a wired network interface (such as a network interface card), a wireless network interface (such as a wireless network interface card), a modem, and any other suitable interface. In at least one embodiment, communication interface 622 may provide a direct connection to a remote server via a direct link to a network, such as the Internet. Communication interface 622 may also indirectly provide such a connection through, for example, a local area network (such as an Ethernet network), a personal area network, a telephone or cable network, a cellular telephone connection, a satellite data connection, or any other suitable connection.

In certain embodiments, communication interface 622 may also represent a host adapter configured to facilitate communication between computing system 610 and one or more additional network or storage devices via an external bus or communications channel. Examples of host adapters include, without limitation, SCSI host adapters, USB host adapters, IEEE 1394 host adapters, SATA and eSATA host adapters, ATA and PATA host adapters, Fibre Channel interface adapters, Ethernet adapters, or the like. Communication interface 622 may also allow computing system 610 to engage in distributed or remote computing. For example, communication interface 622 may receive instructions from a remote device or send instructions to a remote device for execution. In certain embodiments, communication interface 622 may perform and/or be a means for performing, either alone or in combination with other elements, one or more of the determining, limiting, permitting, and using steps disclosed herein. Communication interface 622 may also be used to perform and/or be a means for performing other steps and features set forth in the instant disclosure.

As illustrated in FIG. 6, computing system 610 may also include at least one display device 624 coupled to communication infrastructure 612 via a display adapter 626. Display device 624 generally represents any type or form of device capable of visually displaying information forwarded by display adapter 626. Similarly, display adapter 626 generally represents any type or form of device configured to forward graphics, text, and other data from communication infrastructure 612 (or from a frame buffer, as known in the art) for display on display device 624.

As illustrated in FIG. 6, exemplary computing system 610 may also include at least one input device 628 coupled to communication infrastructure 612 via an input interface 630. Input device 628 generally represents any type or form of input device capable of providing input, either computer or human generated, to exemplary computing system 610. Examples of input device 628 include, without limitation, a keyboard, a pointing device, a speech recognition device, or any other input device. In at least one embodiment, input device 628 may perform and/or be a means for performing, either alone or in combination with other elements, one or more of the determining, limiting, permitting, and using steps disclosed herein. Input device 628 may also be used to perform and/or be a means for performing other steps and features set forth in the instant disclosure.

As illustrated in FIG. 6, exemplary computing system 610 may also include a primary storage device 632 and a backup storage device 633 coupled to communication infrastructure 612 via a storage interface 634. Storage devices 632 and 633 generally represent any type or form of storage device or medium capable of storing data and/or other computer-readable instructions. For example, storage devices 632 and 633 may be a magnetic disk drive (e.g., a so-called hard drive), a floppy disk drive, a magnetic tape drive, an optical disk drive, a flash drive, or the like. Storage interface 634 generally represents any type or form of interface or device for transferring data between storage devices 632 and 633 and other components of computing system 610. In one example, databases 120 from FIG. 1 may be stored in primary storage device 632.

In certain embodiments, storage devices 632 and 633 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 632 and 633 may also include other similar structures or devices for allowing computer software, data, or other computer-readable instructions to be loaded into computing system 610. For example, storage devices 632 and 633 may be configured to read and write software, data, or other computer-readable information. Storage devices 632 and 633 may also be a part of computing system 610 or may be a separate device accessed through other interface systems.

In certain embodiments, storage devices 632 and 633 may be used, for example, to perform and/or be a means for performing, either alone or in combination with other elements, one or more of the determining, limiting, permitting, and using steps disclosed herein. Storage devices 632 and 633 may also be used to perform and/or be a means for performing other steps and features set forth in the instant disclosure.

Many other devices or subsystems may be connected to computing system 610. Conversely, all of the components and devices illustrated in FIG. 6 need not be present to practice the embodiments described and/or illustrated herein. The devices and subsystems referenced above may also be interconnected in different ways from that shown in FIG. 6. Computing system 610 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The phrase "computer-readable medium" generally refers to any form of device, carrier, or medium capable of storing or carrying computer-readable instructions. Examples of computer-readable media include, without limitation, transmission-type media, such as carrier waves, and physical media, such as magnetic-storage media (e.g., hard disk drives and floppy disks), optical-storage media (e.g., CD- or DVD-ROMs), electronic-storage media (e.g., solid-state drives and flash media), and other distribution systems.

The computer-readable medium containing the computer program may be loaded into computing system 610. All or a portion of the computer program stored on the computer-readable medium may then be stored in system memory 616 and/or various portions of storage devices 632 and 633. When executed by processor 614, a computer program loaded into computing system 610 may cause processor 614 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 610 may be configured as an application specific integrated circuit (ASIC) adapted to implement one or more of the exemplary embodiments disclosed herein.

Figure 7:
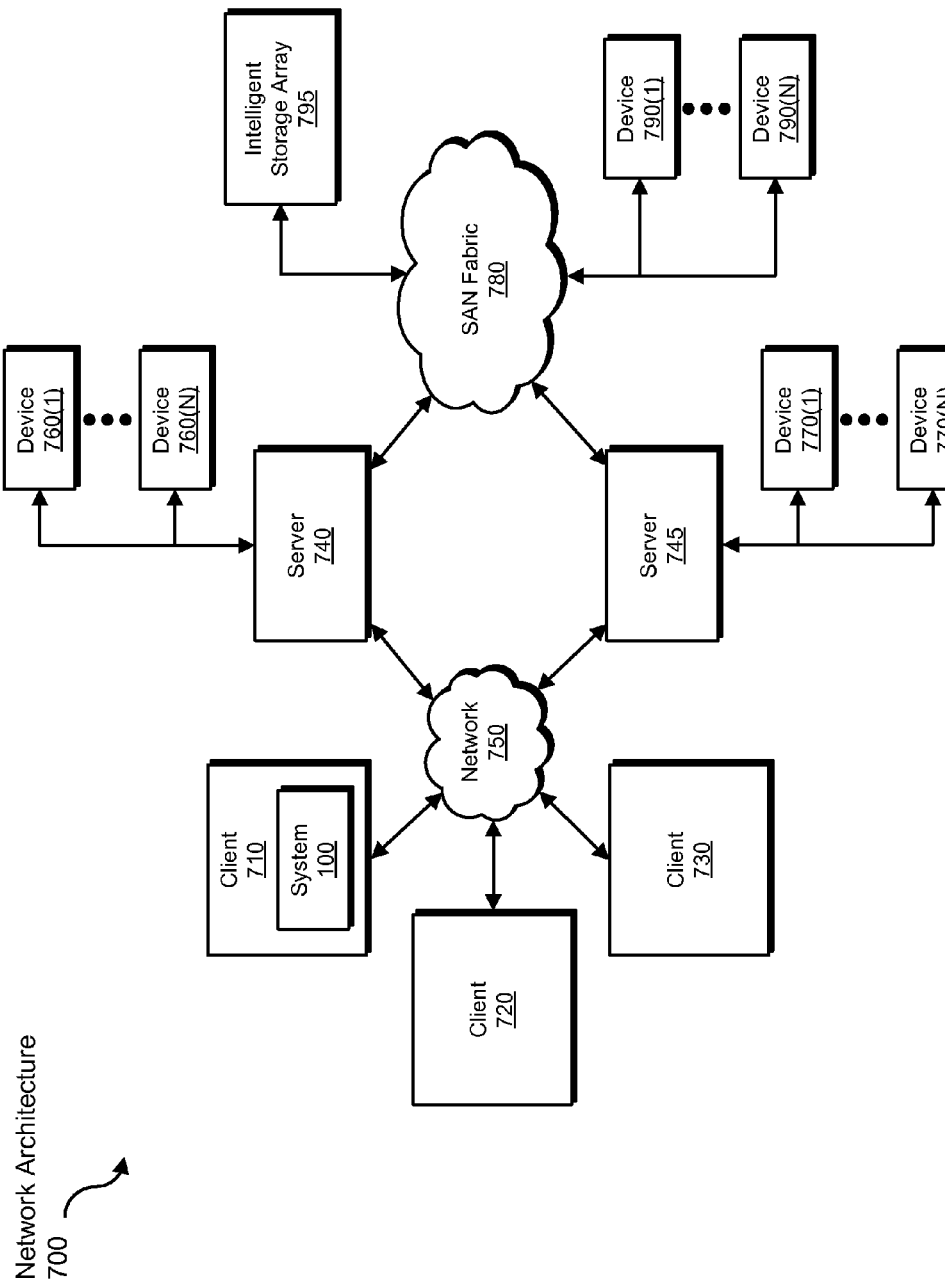
FIG. 7 is a block diagram of an exemplary computing network capable of implementing one or more of the embodiments described and/or illustrated herein.

FIG. 7 is a block diagram of an exemplary network architecture 700 in which client systems 710, 720, and 730 and servers 740 and 745 may be coupled to a network 750. Client systems 710, 720, and 730 generally represent any type or form of computing device or system, such as exemplary computing system 610 in FIG. 6. In one example, client system 710 may include system 100 from FIG. 1.

Similarly, servers 740 and 745 generally represent computing devices or systems, such as application servers or database servers, configured to provide various database services and/or run certain software applications. Network 750 generally represents any telecommunication or computer network including, for example, an intranet, a wide area network (WAN), a local area network (LAN), a personal area network (PAN), or the Internet.

As illustrated in FIG. 7, one or more storage devices 760(1)-(N) may be directly attached to server 740. Similarly, one or more storage devices 770(1)-(N) may be directly attached to server 745. Storage devices 760(1)-(N) and storage devices 770(1)-(N) generally represent any type or form of storage device or medium capable of storing data and/or other computer-readable instructions. In certain embodiments, storage devices 760(1)-(N) and storage devices 770(1)-(N) may represent network-attached storage (NAS) devices configured to communicate with servers 740 and 745 using various protocols, such as NFS, SMB, or CIFS.

Servers 740 and 745 may also be connected to a storage area network (SAN) fabric 780. SAN fabric 780 generally represents any type or form of computer network or architecture capable of facilitating communication between a plurality of storage devices. SAN fabric 780 may facilitate communication between servers 740 and 745 and a plurality of storage devices 790(1)-(N) and/or an intelligent storage array 795. SAN fabric 780 may also facilitate, via network 750 and servers 740 and 745, communication between client systems 710, 720, and 730 and storage devices 790(1)-(N) and/or intelligent storage array 795 in such a manner that devices 790(1)-(N) and array 795 appear as locally attached devices to client systems 710, 720, and 730. As with storage devices 760(1)-(N) and storage devices 770(1)-(N), storage devices 790(1)-(N) and intelligent storage array 795 generally represent any type or form of storage device or medium capable of storing data and/or other computer-readable instructions.

In certain embodiments, and with reference to exemplary computing system 610 of FIG. 6, a communication interface, such as communication interface 622 in FIG. 6, may be used to provide connectivity between each client system 710, 720, and 730 and network 750. Client systems 710, 720, and 730 may be able to access information on server 740 or 745 using, for example, a web browser or other client software. Such software may allow client systems 710, 720, and 730 to access data hosted by server 740, server 745, storage devices 760(1)-(N), storage devices 770(1)-(N), storage devices 790 (1)-(N), or intelligent storage array 795. Although FIG. 7 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 740, server 745, storage devices 760(1)-(N), storage devices 770(1)-(N), storage devices 790(1)-(N), intelligent storage array 795, or any combination thereof. All or a portion of one or more of the exemplary embodiments disclosed herein may also be encoded as a computer program, stored in server 740, run by server 745, and distributed to client systems 710, 720, and 730 over network 750. Accordingly, network architecture 700 may perform and/or be a means for performing, either alone or in combination with other elements, one or more of the determining, limiting, permitting, and using steps disclosed herein. Network architecture 700 may also be used to perform and/or be a means for performing other steps and features set forth in the instant disclosure.

As detailed above, computing system 610 and/or one or more components of network architecture 700 may perform and/or be a means for performing, either alone or in combination with other elements, one or more steps of an exemplary method for using guardian proximity to control computing activities of children.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In certain embodiments, one or more of the software modules disclosed herein may be implemented in a cloud computing environment. Cloud computing environments may provide various services and applications via the internet. These cloud-based services (e.g., software as a service, platform as a service, infrastructure as a service, etc.) may be accessible through a web browser or other remote interface. Various functions described herein may be provided through a remote desktop environment or any other cloud-based computing environment. For example, data may be scanned, from, and/or to a cloud computing environment and/or one or more of modules 102 may operate in a cloud computing environment.

In addition, one or more of the modules described herein may transform data, physical devices, and/or representations of physical devices from one form to another. For example, one or more of the modules described herein may transform a computing system by changing settings on the computing system to allow a child to access a resource of the system when a guardian is in proximity of the system.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising."

What is claimed is:

1. A computer-implemented method for using guardian proximity to control computing activities of children, at least a portion of the method being performed by a computing device comprising at least one processor, the method comprising:
    determining that a child is attempting to access a computing system;
    determining whether a guardian of the child is in proximity of the computing system;
    determining whether a parental-control key is connected to the computing system, the parental-control key comprising a USB dongle;
    limiting the child's access to one or more resources of the computing system if the parental-control key is not connected to the computing system;
    permitting the child to access the one or more resources of the computing system if the parental-control key is connected to the computing system and the guardian of the child is in proximity of the computing system.

2. The computer-implemented method of claim 1, wherein determining whether the guardian of the child is in proximity of the computing system comprises:
    using a proximity sensor to detect the presence of a proximity device carried by the guardian.

3. The computer-implemented method of claim 2, wherein using a proximity sensor to detect the presence of a proximity device carried by the guardian comprises
    using the proximity sensor to detect the presence of an electronic key fob carried by the guardian.

4. The computer-implemented method of claim 3, wherein:
    the parental-control key comprises the proximity sensor.

5. The computer-implemented method of claim 3, wherein:
    the proximity sensor comprises a radio-frequency-identification reader.

6. The computer-implemented method of claim 3, wherein:
    the electronic key fob carried by the guardian comprises an automobile key.

7. The computer-implemented method of claim 2, wherein the proximity device carried by the guardian comprises at least one of:
    a badge carried by the guardian;
    a card carried by the guardian;
    a piece of jewelry worn by the guardian.

8. The computer-implemented method of claim 1, wherein:
    determining whether the guardian of the child is in proximity of the computing system comprises using a proximity sensor to detect the presence of a proximity device carried by the guardian;
    the parental-control key comprises the proximity sensor.

9. The computer-implemented method of claim 1, wherein determining that the child is attempting to access the computing system comprises at least one of:
    determining that the child is attempting to log onto the computing system;
    determining that the child is attempting to access a resource of the computing system.

10. The computer-implemented method of claim 1, wherein:
- limiting the child's access to the one or more resources of the computing system comprises prohibiting the child from accessing the Internet;
- permitting the child to access the one or more resources of the computing system comprises permitting the child to access the Internet.

11. The computer-implemented method of claim 1, wherein determining whether a guardian of the child is in proximity of the computing system comprises at least one of:
- using face-recognition technology to identify the guardian;
- using speaker-recognition technology to identify the guardian.

12. The computer-implemented method of claim 1, wherein determining whether a guardian of the child is in proximity of the computing system comprises:
- using a global-positioning-system device to determine a location of the guardian of the child.

13. A system for using guardian proximity to control computing activities of children, the system comprising:
- at least one processor;
- an access module programmed to direct the processor to determine that a child is attempting to access a computing system;
- a proximity module programmed to direct the processor to determine whether a guardian of the child is in proximity of the computing system;
- a parental-control key that comprises a USB dongle;
- a parental-control module programmed to direct the processor to:
  - limit the child's access to one or more resources of the computing system if the parental-control key is not connected to the computing system;
  - permit the child to access the one or more resources of the computing system if the parental-control key is connected to the computing system and the guardian of the child is in proximity of the computing system.

14. The system of claim 13, further comprising:
- a proximity sensor in communication with the proximity module and configured to detect proximity of the guardian.

15. The system of claim 13, further comprising:
- a proximity sensor programmed to detect the presence of a proximity device carried by the guardian, wherein the parental-control key comprises the proximity sensor.

16. A non-transitory computer-readable-storage medium comprising one or more computer-executable instructions that, when executed by at least one processor of a computing device, cause the computing device to:
- determine that a child is attempting to access a computing system;
- determine whether a guardian of the child is in proximity of the computing system;
- determine whether a parental-control key is connected to the computing system, the parental-control key comprising a USB dongle;
- limit the child's access to one or more resources of the computing system if the parental-control key is not connected to the computing system;
- permit the child to access the one or more resources of the computing system if the parental-control key is connected to the computing system and the guardian of the child is in proximity of the computing system.

* * * * *